United States Patent
Heikurinen et al.

(10) Patent No.: US 10,408,223 B2
(45) Date of Patent: Sep. 10, 2019

(54) LOW HUB-TO-TIP RATIO FAN FOR A TURBOFAN GAS TURBINE ENGINE

(71) Applicant: PRATT & WHITNEY CANADA CORP., Longueuil (CA)

(72) Inventors: Kari Heikurinen, Mississauga (CA); Peter Townsend, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 250 days.

(21) Appl. No.: 15/616,302

(22) Filed: Jun. 7, 2017

(65) Prior Publication Data
US 2017/0268529 A1 Sep. 21, 2017

Related U.S. Application Data

(63) Continuation of application No. 15/052,178, filed on Feb. 24, 2016, now Pat. No. 9,709,070, which is a (Continued)

(51) Int. Cl.
*F01D 5/30* (2006.01)
*B23K 20/12* (2006.01)
(Continued)

(52) U.S. Cl.
CPC .......... *F04D 29/384* (2013.01); *B23K 20/129* (2013.01); *F01D 5/14* (2013.01);
(Continued)

(58) Field of Classification Search
CPC . F01D 5/14; F01D 5/3061; F01D 5/34; F02K 3/06; F04D 29/023; F04D 29/321;
(Continued)

(56) References Cited

U.S. PATENT DOCUMENTS 3,494,129 A * 2/1970 Krebs ................. F02K 3/06
415/144
3,540,682 A * 11/1970 Ferguson ........... F01D 5/022
244/53 R
(Continued)

FOREIGN PATENT DOCUMENTS

EP 0887143 12/1998
EP 2738392 1/2019
(Continued)

*Primary Examiner* — Igor Kershteyn
(74) *Attorney, Agent, or Firm* — Norton Rose Fulbright Canada LLP

(57) ABSTRACT

A fan for a turbofan gas turbine engine having a low hub-to-tip ratio is disclosed. The fan includes a rotor hub and a plurality of radially extending fan blades. Each fan blade defines a hub radius ($R_{HUB}$), which is the radius of the leading edge at the hub relative to a centerline of the fan, and a tip radius ($R_{TIP}$), which is the radius of the leading edge at a tip of the fan blade relative to the centerline of the fan. The ratio of the hub radius to the tip radius ($R_{HUB}/R_{TIP}$) is less than 0.29. In a particular embodiment, this ratio is between 0.25 and 0.29. In another particular embodiment, this ratio is less than 0.25.

19 Claims, 2 Drawing Sheets

Related U.S. Application Data continuation of application No. 13/687,540, filed on Nov. 28, 2012, now Pat. No. 9,303,589.

(51) Int. Cl.

| | | |
|---|---|---|
| *F01D 5/14* | (2006.01) | |
| *F01D 5/34* | (2006.01) | |
| *F02K 3/06* | (2006.01) | |
| *F04D 29/02* | (2006.01) | |
| *F04D 29/32* | (2006.01) | |
| *F04D 29/64* | (2006.01) | |
| *F04D 29/38* | (2006.01) | |
| *F04D 29/34* | (2006.01) | |
| *B23K 101/00* | (2006.01) | |

(52) U.S. Cl.
CPC ............ *F01D 5/3061* (2013.01); *F01D 5/34* (2013.01); *F02K 3/06* (2013.01); *F04D 29/023* (2013.01); *F04D 29/321* (2013.01); *F04D 29/324* (2013.01); *F04D 29/329* (2013.01); *F04D 29/34* (2013.01); *F04D 29/388* (2013.01); *F04D 29/644* (2013.01); *B23K 2101/001* (2018.08); *F05D 2230/239* (2013.01); *F05D 2260/40* (2013.01); *Y10T 29/49245* (2015.01)

(58) Field of Classification Search
CPC ...... F04D 29/324; F04D 29/329; F04D 29/34; F04D 29/384; F04D 29/388; F04D 29/644; B23K 20/129; B23K 2201/001; F05D 2230/239; F05D 2260/40; Y10T 29/49245

See application file for complete search history.

(56) References Cited

U.S. PATENT DOCUMENTS

| | | |
|---|---|---|
| 3,993,414 A | 11/1976 | Meauze et al. |
| 4,595,340 A | 6/1986 | Klassen et al. |
| 4,790,133 A | 12/1988 | Stuart |
| 5,108,261 A | 4/1992 | Ress, Jr. et al. |
| 5,169,288 A | 12/1992 | Gliebe et al. |
| 5,188,275 A | 2/1993 | Daines |
| 5,501,575 A | 3/1996 | Eldredge et al. |
| 5,813,593 A | 9/1998 | Galaske |
| 6,409,469 B1 | 6/2002 | Tse |
| 6,722,847 B2 | 4/2004 | Freeman et al. |
| 6,732,502 B2 | 5/2004 | Seda et al. |
| 7,721,526 B2 | 5/2010 | Fujimura et al. |
| 7,748,950 B2 | 7/2010 | Kodama et al. |
| 7,765,786 B2 | 8/2010 | Klingels et al. |
| 7,918,652 B2 | 4/2011 | Fujimura |
| 8,568,101 B2 | 10/2013 | Fujimura |
| 8,579,592 B2 | 11/2013 | Kodama |
| 10,072,510 B2 | 9/2018 | Miller et al. |
| 10,137,981 B2 | 11/2018 | Miller et al. |
| 10,190,496 B2 | 1/2019 | Schwarz et al. |
| 10,253,784 B2 | 4/2019 | Fulayter |
| 2014/0060005 A1* | 3/2014 | Lugg ...................... F01D 15/10 60/226.3 |
| 2016/0363047 A1 | 12/2016 | Schwarz et al. |
| 2017/0167504 A1 | 6/2017 | Jablonski et al. |
| 2017/0268529 A1 | 9/2017 | Heikurinen et al. |
| 2017/0298954 A1 | 10/2017 | Qiu et al. |
| 2018/0231019 A1 | 8/2018 | Barale et al. |
| 2018/0231021 A1 | 8/2018 | Wilson et al. |
| 2019/0048826 A1 | 2/2019 | Pointon et al. |
| 2019/0063368 A1 | 2/2019 | Phelps et al. |

FOREIGN PATENT DOCUMENTS

| | | |
|---|---|---|
| GB | 2382382 | 5/2003 |
| RU | 2677769 C1 | 1/2019 |

* cited by examiner

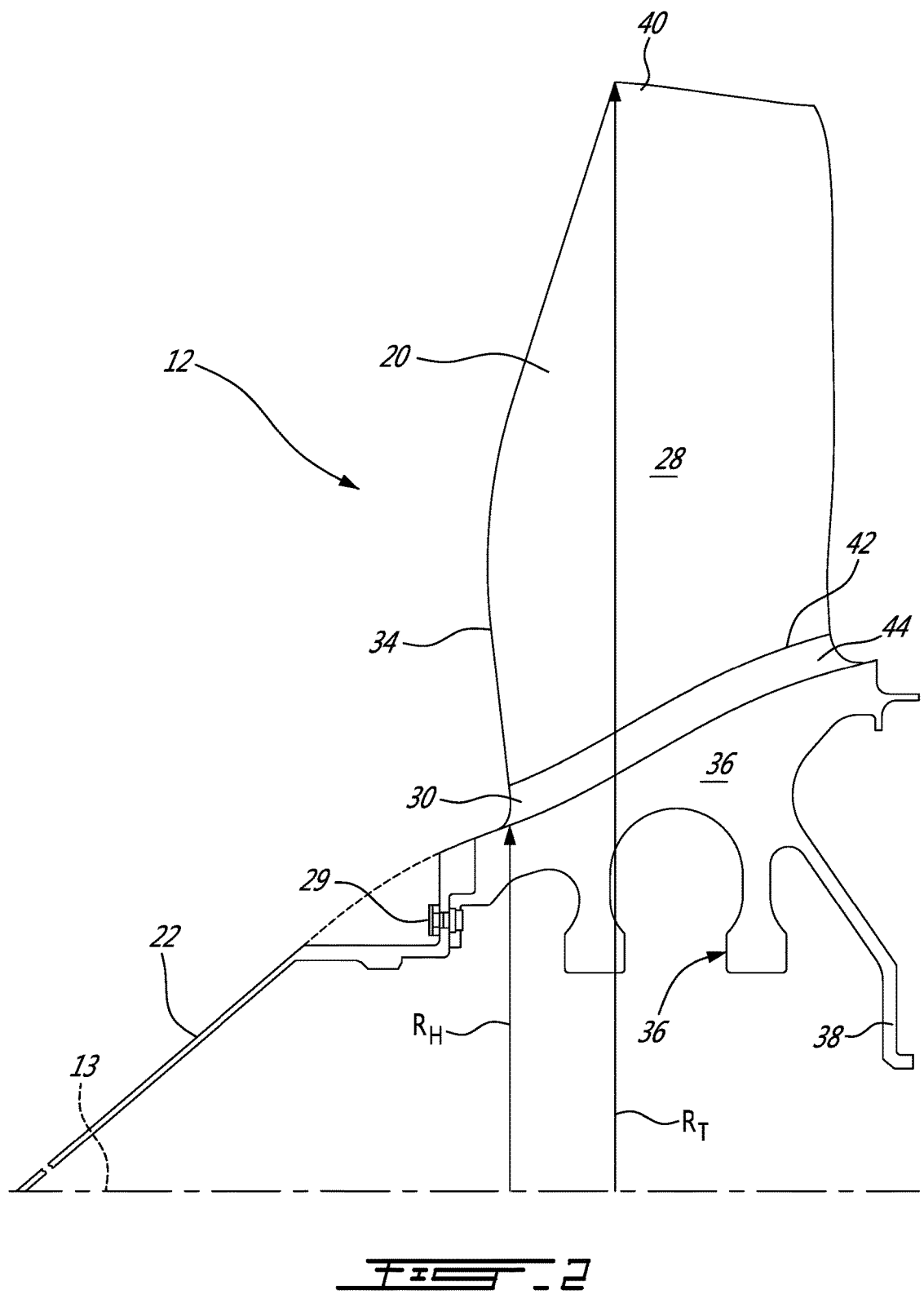

LOW HUB-TO-TIP RATIO FAN FOR A TURBOFAN GAS TURBINE ENGINE

CROSS-REFERENCE TO RELATED APPLICATIONS

This is a continuation of U.S. patent application Ser. No. 15/052,178 filed Feb. 24, 2016, which is itself a continuation of U.S. patent application Ser. No. 13/687,540 filed Nov. 28, 2012, now issued as U.S. Pat. No. 9,303,589, the entire content of each which is incorporated herein by reference.

TECHNICAL FIELD

The present invention relates to turbofan engines and more particularly to fans for such engines having low hub to tip ratios.

BACKGROUND

Most gas turbine engine fans are composed of a central hub onto which a plurality of separately formed fan blades are secured. Integrated bladed rotor (IBR) fans are known for their relative lightness and therefore are desirable, however known IBR fans cannot be formed having a low hub to tip radius ratio because of limitations in manufacturing capabilities. Such a low hub to tip radius ratio is however desirable because it means the maximum diameter of the fan can be reduced without negatively effecting performance. Reducing the overall diameter of the fan reduces weight and improves the efficiency of the fan.

Therefore, while the advantages of reducing the ratio of the radius of the hub to the radius of the tip are well appreciated in terms of reducing the specific flow of air entering the leading edge of the fan, attempts to date to reduce the specific flow by reducing this ratio have not been readily possible, particularly for IBR fans. Attempts to manufacture an integrated bladed rotor (IBR) fan with a low hub to tip ratio have not been successful because of the lack of space for machine tools between the roots of the blades when the hub is also reduced in size.

SUMMARY

There is accordingly provided a fan for a turbofan gas turbine engine, the fan defining a fan centerline and comprising a rotor hub and a plurality of fan blades adapted to rotate about the fan centerline, the fan blades extending radially from the rotor hub to outer tips thereof, the fan blades circumferentially spaced apart about the rotor hub in a single axial blade row, each of the fan blades having a leading edge, a hub radius (RHUB) and a tip radius (RTIP), wherein the hub radius (RHUB) is the radius of the leading edge at the hub relative to the fan centerline, and the tip radius (RTIP) is the radius of the leading edge at the outer tip relative to the fan centerline, and wherein the ratio of the hub radius to the tip radius (RHUB/RTIP) is less than 0.29.

The ratio of the hub radius to the tip radius (RHUB/RTIP) of the fan as described above may be more particularly is less than 0.25.

The ratio of the hub radius to the tip radius (RHUB/RTIP) of the fan as described above may be more particularly between 0.25 and 0.29.

The fan as described above may be an integrally bladed rotor, the fan blades being integrally formed with the rotor hub.

The rotor hub of the integrally bladed rotor of the fan as described above may include a preform having root stubs disposed on the rotor hub at circumferential positions corresponding to at least alternate ones of said fan blades in the single axial blade row, the root stubs being formed on the rotor hub prior to the fan blades being fastened thereto.

The root stubs of the hub of the integrally bladed rotor of the fan as described above may have airfoils welded thereto to form the fan blades of the integrally bladed rotor.

The airfoils of the integrally bladed rotor of the fan as described above may be linear-friction-welded to the respective root stubs.

The preform of the integrally bladed rotor of the fan as described above may have the root stubs disposed on the rotor hub for each of the fan blades in the single blade row.

There is also provided a turbofan gas turbine engine including a fan upstream of at least one compressor and defining a fan centerline about which the fan rotates, the fan comprising: a rotor hub and a plurality of fan blades substantially radially extending from the rotor hub to outer tips thereof, the fan blades being arranged in a single blade row on the rotor hub, each of the fan blades of the single blade row having an airfoil with a leading edge, the leading edge of the airfoil extending from a hub radius (RHUB) at the rotor hub to a tip radius (RTIP) at the outer tip, and wherein a ratio of the hub radius to the tip radius (RHUB/RTIP) is less than 0.29.

The ratio of the hub radius to the tip radius (RHUB/RTIP) of the turbofan gas turbine engine as described above may be between 0.25 and 0.29.

The ratio of the hub radius to the tip radius (RHUB/RTIP) of the turbofan gas turbine engine as described above may be less than 0.25.

The fan of the turbofan gas turbine engine as described above may be an integrally bladed rotor, the airfoils of the fan blades being integrally formed with the rotor hub.

The rotor hub of the integrally bladed rotor as described above may include a preform having root stubs disposed on the rotor hub at circumferential positions corresponding to at least alternate ones of said fan blades in the single axial blade row, the root stubs being formed on the rotor hub prior to the airfoils being fastened thereto.

The airfoils of the integrally bladed rotor as described above may be welded to the root stubs to form the fan blades of the integrally bladed rotor.

The airfoils of the integrally bladed rotor as described above may be linear-friction-welded to the respective root stubs.

The preform of the integrally bladed rotor as described above may have the root stubs disposed on the rotor hub for each of the fan blades in the single blade row.

There is further provided a method of manufacturing a fan for a turbofan gas turbine engine, the fan adapted to rotate about a fan centerline axis, the method comprising: providing a rotor hub having an outer peripheral surface defining a hub radius relative to the fan centerline axis; selecting a predetermined length of fan blade airfoils, the predetermined length selected such that a ratio of the hub radius to a tip radius of the blade airfoils, as measured from the fan centerline axis to tips of the fan blade airfoils once the fan blade airfoils are mounted to the rotor hub, is less than 0.29; and positioning said fan blade airfoils to the outer peripheral surface of the rotor hub in an axially aligned single blade row, the fan blade airfoils being circumferentially spaced about the rotor hub within the axially aligned single blade row.

The method as described above may further comprise integrally forming the fan blade airfoils and the rotor hub to produce an integrally bladed rotor.

The method as described above may further comprise forming a rotor hub preform having a number of root stubs circumferentially spaced apart on a periphery of the rotor hub, the root stubs being axially aligned to define said single blade row, and fastening the fan blade airfoils to the root stubs to form fan blades integrally formed with the rotor hub.

The step of selecting of the method as described above may further comprise selecting the predetermined length of the fan blade airfoils such that the ratio of the hub radius to the tip radius of the fan blade airfoils is between 0.25 and 0.29.

The step of selecting of the method as described above may further comprise selecting the predetermined length of the fan blade airfoils such that the ratio of the hub radius to the tip radius of the fan blade airfoils is less than 0.25.

The method as described above may further comprise integrally forming circumferentially alternate ones of said fan blade airfoils with the hub preform directly to the outer peripheral surface of the rotor hub preform without root stubs, leaving alternate root stubs on the hub preform to provide access for machine tools between the circumferentially alternate ones of said fan blade airfoils.

BRIEF DESCRIPTION OF THE DRAWINGS

Reference is now made to the accompanying figures in which:

FIG. 2 is a partial axial cross-sectional view of an embodiment of the fan of the present disclosure.

DETAILED DESCRIPTION

Figure 1:
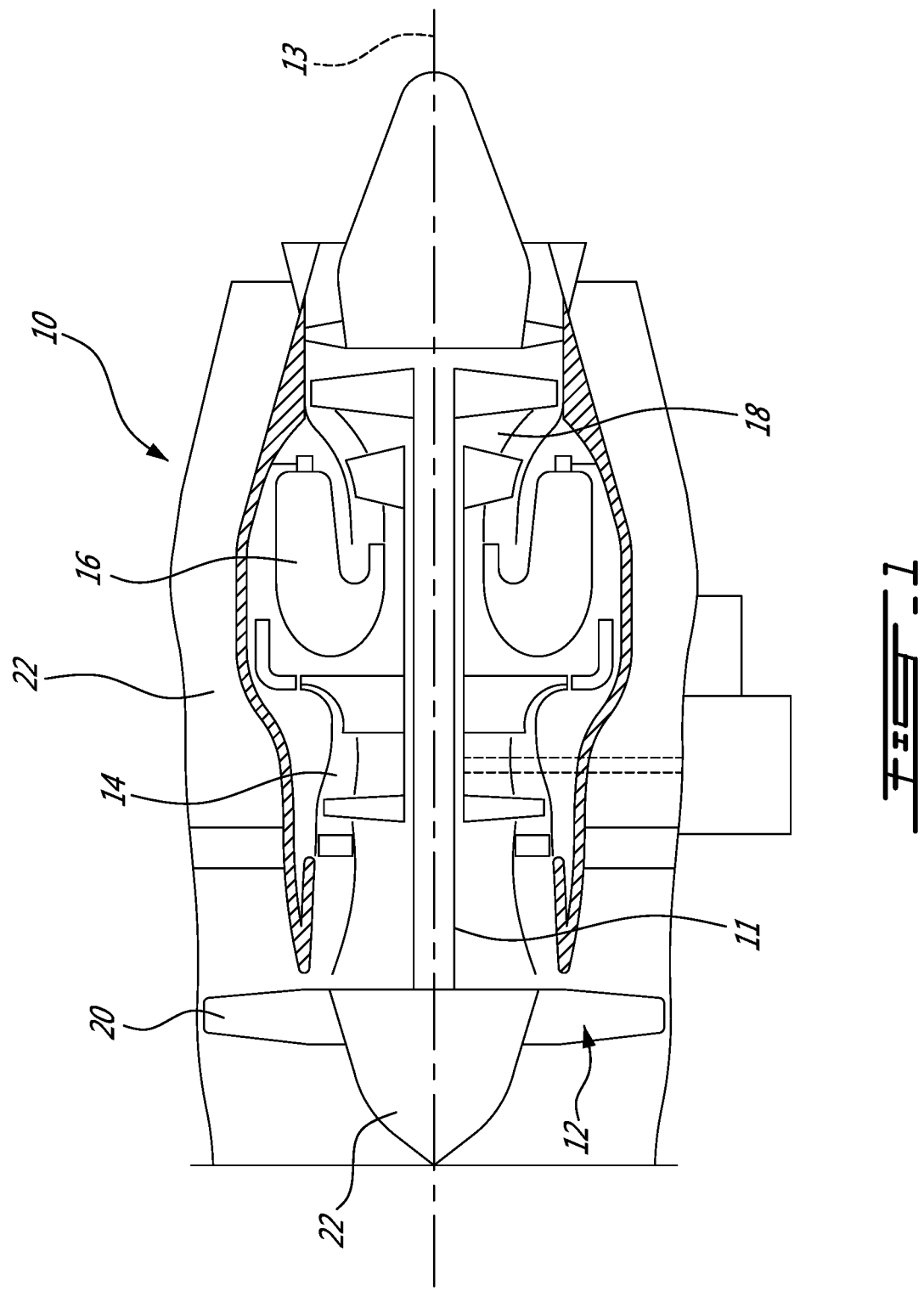
FIG. 1 is a schematic cross-sectional view of a gas turbine engine having a fan in accordance with the present disclosure.

FIG. 1 illustrates a turbofan gas turbine engine 10 generally comprising in serial flow communication, a fan assembly 12 through which ambient air is propelled, and a core including a compressor section 14 for pressurizing the air, a combustor 16 in which the compressed air is mixed with fuel and ignited for generating an annular stream of hot combustion gases, and a turbine section 18 for extracting energy from the combustion gases. A centerline main engine axis 13 extends longitudinally through the turbofan engine 10.

The fan 12 propels air through both the engine core and the bypass duct 22, and may be mounted to the low pressure main engine shaft 11. The fan 12 includes a plurality of radially extending fan blades 20 and a central hub as will be seen, which hub has a nose cone 22 mounted thereto to protect the hub. As will be described in greater detail below, the fan 12 may be an integrally bladed rotor (IBR), in which case the fan blades 20 are integrally formed with the central hub that is fastened to the low pressure (LP) engine shaft 11 for rotation therewith.

Referring now to FIG. 2, the fan 12 comprises a plurality of fan blades 20 integrally formed with, and substantially radially extending from, a central fan hub 36 which is mounted to an engine shaft, such as the low pressure shaft 11, by means of one or more hub support portions 38 which are also integrally formed with the hub. Each of the blades 20 defines an airfoil 28 which has a leading edge 34 which extends from a blade root 30 to a blade tip 40. The blade 20 is integrated with the hub 36, i.e. such the blades 20 are integrally formed as a monolithic component with the fan hub 36 to form an IBR fan. The nose cone 22 of the engine may be fastened to an upstream end of the fan hub 36 by a plurality of fasteners 29.

When the radius of the leading edge 30 on the hub 36 is reduced while the radius of the blade tip at 40 is maintained, the flow area (FA) of the fan 20 is increased thus reducing the specific flow (SF). As seen in FIG. 2, the gaspath through the fan 12 is defined by the annular area between the hubs 30 and the tips 40 of the fan blades 20. The radius of the fan hub ($R_{HUB}$), measured at the leading edge 34 of the blade 20, defines the radially inner gaspath boundary and the radius of the blade tip ($R_{TIP}$), also measured at the leading edge 34, defines the radially outer gaspath boundary. The specific flow of the fan 12 is therefore defined as the mass flow (MF) of air entering the leading edge of the fan 12, divided by the flow area (FA) at the fan leading edge, normal to the engine axis 13.

The hub to tip ratio of the fan 12 is defined as the ratio of the radius of the fan hub ($R_{HUB}$) at the leading edge divided by the radius of fan blade tip ($R_{TIP}$) at the leading edge. As shown in FIG. 2, these radii are measured from the engine centerline axis 13.

Thus, specific flow is determined as follows:

$$SF=MF/FA,$$

where SF is the specific flow, MF is the mass flow, and FA the flow area. Reduction of this SF of the fan is desirable as a reduced SF helps to improve the overall aerodynamic efficiency of the fan because of the lower air velocity.

A reduction in the hub to tip ratio ($R_{HUB}/R_{TIP}$) will therefore also cause a reduction in the specific flow (SF) of the fan. Alternatively, the radius of both the hub 36 and the blade tip 40 can be reduced while retaining the same specific flow SF. However, the ratio of the hub to tip radii is preferably reduced. Accordingly, the present IBR fan 12 has a ratio of the hub radius to the tip radius, i.e. $R_{HUB}/R_{TIP}$, which is at least less than 0.29. In a particular embodiment, the ratio of the hub radius to the tip radius ($R_{HUB}/R_{TIP}$) is between about 0.25 and about 0.29. In a further particular embodiment, the ratio of the hub radius to the tip radius ($R_{HUB}/R_{TIP}$) is less than or equal to 0.25.

The advantage of a lower tip radius is a smaller diameter fan and therefore a lighter weight engine. Lowering the hub leading edge radius also changes the flow angle of the airstream, and the resulting rearward sweep in the lower portion of the fan blade airfoils 28 improves performance by reducing the leading edge velocities through the sweep effect and also draws flow towards the hub 36 which helps to reduce flow separation that the blade root.

The advantage of using the integrally bladed rotor (IBR) fan 12 is its reduced weight compared to a traditional detachable bladed rotor. The machining of an IBR fan 12 with such a low hub/tip ratio is made difficult by the lack of space between the blades 20, particularly at the blade roots 30 since the gap between the blades is much narrower the smaller the radius of the fan.

However, in one particular method of manufacturing the IBR fan 12 described herein, it has been found that by first machining a root stub 44 on the hub 36, or more specifically on a hub preform, the lower hub radius, and more particularly the low hub to tip radius ratios described above, can be obtained because it is easier to access the radial gap between adjacent blades 20 with machine tools. The blade airfoils 28 may then be fixed to the root stubs 44 of the hub preform be welded by Linear Friction Welding (LFW), for example, along the joint line 42 as shown on the blade 20 in FIG. 2. It has been contemplated that alternative methods may also be used, such as forming a root stub 44 only for every alternate blade, while machining the full blade 20 between each alternate root stub. This would allow sufficient access for machine tools between two alternate full blades, to machine around the around the remaining root stub.

Thus, a low-weight fan 12 as described herein is achieve, because of its integrated bladed rotor construction, and which provides a hub to tip radius ratio of at least less than 0.29, and more particularly between 0.25 and 0.29, and more particularly still a hub to tip radius ratio of 0.25 or less.

The above description is meant to be exemplary only, and one skilled in the art will recognize that changes may be made to the embodiments described while still falling within the scope of the appended claims, which define the present invention. Such modifications will be apparent to those skilled in the art, in light of a review of this disclosure.

The invention claimed is:

1. A fan for a turbofan gas turbine engine, the fan comprising a rotor hub and a plurality of fan blades extending from and being integral with the hub to form an integrally bladed rotor, the fan blades circumferentially spaced apart to form a blade row, each of the fan blades of the blade row at least partially axially overlapping circumferentially adjacent ones of the fan blades of the blade row, each of the fan blades having a leading edge extending between the rotor hub and a blade tip, and wherein a ratio of a hub radius to a tip radius ($R_{HUB}/R_{TIP}$) of the fan blades within the blade row is less than 0.29, wherein the hub radius ($R_{HUB}$) and the tip radius ($R_{TIP}$) are measured at the leading edge of the fan blades.

2. The fan as defined in claim 1, wherein the ratio of the hub radius to the tip radius ($R_{HUB}/R_{TIP}$) is less than 0.25.

3. The fan as defined in claim 1, wherein the ratio of the hub radius to the tip radius ($R_{HUB}/R_{TIP}$) is between 0.25 and 0.29.

4. The fan as defined in claim 1, wherein the rotor hub of the integrally bladed rotor includes a preform having root stubs disposed on the rotor hub at circumferential positions corresponding to at least alternate ones of said fan blades in the single axial blade row, the root stubs being formed on the rotor hub prior to the fan blades being fastened thereto.

5. The fan as defined in claim 4, wherein the root stubs have airfoils welded thereto to form the fan blades of the integrally bladed rotor.

6. The fan as defined in claim 5, wherein the airfoils are linear-friction-welded to the respective root stubs.

7. The fan as defined in claim 4, wherein the preform has said root stubs disposed on the rotor hub for each of the fan blades in the single blade row.

8. The fan as defined in claim 4, wherein the fan blades having a rearward sweep in a radially inner portion of the leading edge.

9. A fan for a turbofan gas turbine engine, the fan comprising a rotor hub and a plurality of fan blades integral with the rotor hub to form an integrally bladed rotor having a single blade row, each of the fan blades having a leading edge extending between the rotor hub and an outer blade tip, the fan having a hub-to-tip ratio defined by a hub radius at the leading edge divided by a tip radius at the leading edge, the hub-to-tip ratio being less than 0.25.

10. The fan as defined in claim 9, wherein the rotor hub of the integrally bladed rotor includes a preform having root stubs disposed on the rotor hub at circumferential positions corresponding to at least alternate ones of said fan blades in the single axial blade row, the root stubs being formed on the rotor hub prior to the fan blades being fastened thereto.

11. The fan as defined in claim 9, wherein the root stubs have airfoils welded thereto to form the fan blades of the integrally bladed rotor.

12. The fan as defined in claim 11, wherein the airfoils are linear-friction-welded to the respective root stubs.

13. The fan as defined in claim 11, wherein the preform has said root stubs disposed on the rotor hub for each of the fan blades in the single blade row.

14. The fan as defined in claim 9, wherein the fan blades have a rearward sweep in a radially inner portion of the leading edge.

15. A method of manufacturing an integrally bladed fan for a turbofan gas turbine engine, the integrally bladed fan adapted to rotate about a fan centerline axis, the method comprising: providing a rotor hub having an outer peripheral surface defining a hub radius relative to the fan centerline axis; providing a plurality of fan blade airfoils having a predetermined length; and integrally forming the fan blade airfoils and the rotor hub to produce a blade row of the fan blade airfoils on the rotor hub, wherein each of the fan blade airfoils of the blade row at least partially axially overlaps circumferentially adjacent ones of the fan blade airfoils within the blade row, the fan blade airfoils of the blade row thus formed providing a ratio of the hub radius to a tip radius of the fan blade airfoils, measured from the fan centerline axis to tips of the fan blade airfoils at leading edges thereof, of less than 0.29.

16. The method of claim 15, further comprising forming a rotor hub preform having a number of root stubs circumferentially spaced apart on a periphery of the rotor hub, the root stubs being axially aligned to define said single blade row, and fastening the fan blade airfoils to the root stubs to form fan blades integrally formed with the rotor hub.

17. The method as defined in claim 15, further comprising selecting the predetermined length of the fan blade airfoils such that the ratio of the hub radius to the tip radius is between 0.25 and 0.29.

18. The method as defined in claim 15, further comprising selecting the predetermined length of the fan blade airfoils such that the ratio of the hub radius to the tip radius is less than 0.25.

19. The method as defined in claim 15, further comprising integrally forming circumferentially alternate ones of said fan blade airfoils with the hub preform directly to the outer peripheral surface of the rotor hub preform without root stubs, leaving alternate root stubs on the hub preform to provide access for machine tools between the circumferentially alternate ones of said fan blade airfoils.

* * * * *